US008970912B2

(12) United States Patent
Makino

(10) Patent No.: US 8,970,912 B2
(45) Date of Patent: Mar. 3, 2015

(54) IMAGE FORMING APPARATUS WHICH PERFORMS TONE CORRECTION

(71) Applicant: Canon Kabushiki Kaisha, Tokyo (JP)

(72) Inventor: Daisuke Makino, Toride (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/858,129

(22) Filed: Apr. 8, 2013

(65) Prior Publication Data

US 2013/0278951 A1    Oct. 24, 2013

(30) Foreign Application Priority Data

Apr. 19, 2012 (JP) .................................. 2012-096041

(51) Int. Cl.
  H04N 1/40      (2006.01)
  G06K 15/02     (2006.01)
  G03G 15/00     (2006.01)

(52) U.S. Cl.
  CPC ............ G06K 15/02 (2013.01); G03G 15/5041 (2013.01)
  USPC ........................................ 358/3.23; 358/504

(58) Field of Classification Search
  CPC ............ G09G 2320/0626; G09G 5/06; G09G 2320/0693; G09G 2320/0673; G03G 15/5058; G03G 2215/00063; G03G 15/50; G03G 15/5041; G03G 15/5062; G03G 15/0824; H04N 1/6033; H04N 1/00031; H04N 1/00087; H04N 5/202
  USPC ........ 358/1.9, 3.23, 504, 1.15, 3.1, 3.21, 518; 399/49, 15, 72; 345/601; 382/167
  See application file for complete search history.

(56) References Cited

U.S. PATENT DOCUMENTS

| 4,766,503 | A  | * | 8/1988 | Lambert et al.   | 386/201 |
|-----------|----|---|--------|------------------|---------|
| 5,548,663 | A  | * | 8/1996 | Sekine et al.    | 382/164 |
| 7,239,833 | B2 | * | 7/2007 | Tomita et al.    | 399/299 |
| 7,403,653 | B2 | * | 7/2008 | Hirashima et al. | 382/167 |
| 7,715,741 | B2 | * | 5/2010 | Yamamoto         | 399/49  |
| 8,155,438 | B2 | * | 4/2012 | Hirashima et al. | 382/167 |
| 8,412,063 | B2 | * | 4/2013 | Obara et al.     | 399/49  |

FOREIGN PATENT DOCUMENTS

JP         2011-257598 A     12/2011

* cited by examiner

*Primary Examiner* — Thomas D Lee
*Assistant Examiner* — Stephen M Brinich
(74) *Attorney, Agent, or Firm* — Rossi, Kimms & McDowell LLP

(57) ABSTRACT

An image forming apparatus includes: a holding unit configured to hold image processing coefficients, each of which representing a relationship between an input density and an output density of an image signal output to an image forming unit; and an updating unit configured to update an image processing coefficient based on the relationship between densities of measurement images and densities of image signals for forming the measurement images. The updating unit is further configured to, when a maximum value of an output density of the image processing coefficients is smaller than a maximum value of the density of the image signal, form at least one first measurement image in accordance with an image signal indicating a density higher than the maximum value of the output density of the image processing coefficients.

17 Claims, 8 Drawing Sheets

PRINTING MATERIAL CONVEYANCE DIRECTION

FIG. 5

| PATCH NUMBER | INPUT | OUTPUT |
|---|---|---|
| #1 | 0% | 1% |
| #2 | 10% | 21% |
| #3 | 20% | 32% |
| #4 | 30% | 39% |
| #5 | 40% | 44% |
| #6 | 50% | 49% |
| #7 | 60% | 53% |
| #8 | 70% | 58% |
| #9 | 80% | 63% |
| #10 | 90% | 70% |
| #11 | 99% | 79% |
| #12 | 100% | 100% |

FIG. 4B

| INPUT | OUTPUT |
|---|---|
| 0% | 1% |
| 1% | 2% |
| 2% | 3% |
| 3% | 5% |
| 4% | 7% |
| ... | ... |
| 96% | 75% |
| 97% | 76% |
| 98% | 78% |
| 99% | 79% |
| 100% | 100% |

MODIFIED IMAGE PROCESSING COEFFICIENTS

FIG. 4A

| INPUT | OUTPUT |
|---|---|
| 0% | 1% |
| 1% | 2% |
| 2% | 3% |
| 3% | 5% |
| 4% | 7% |
| ... | ... |
| 96% | 75% |
| 97% | 76% |
| 98% | 78% |
| 99% | 79% |
| 100% | 81% |

IMAGE PROCESSING COEFFICIENTS

IMAGE FORMING APPARATUS WHICH PERFORMS TONE CORRECTION

BACKGROUND OF THE INVENTION

1. Field of the Invention

The present invention relates to tone control in an image forming apparatus such as a copying machine or printer.

2. Description of the Related Art

Japanese Patent Laid-Open No. 2011-257598 discloses an image forming apparatus which forms a plurality of measurement images (patch images) having different tones, detects the densities of the patch images, and determines image processing coefficients for conversion from an input density into an output density. The image processing coefficient is tone correction data used for tone correction in image formation. Japanese Patent Laid-Open No. 2011-257598 proposes, when updating image processing coefficients, to form patch images using image processing coefficients before updating.

For example, assume that an image processing coefficient for converting an output density into a value smaller than 100% when the input density is 100% is created. In this case, if patch images are formed using image processing coefficients before updating, a patch image having a maximum density is formed in accordance with an image signal indicating a density of lower than 100%. Also, assume that the maximum density of a patch image formed at this time is lower than a target maximum density. In this case, tone correction data, that is, image processing coefficients in a range of the maximum density of a formed patch image to the target maximum density are determined by extrapolation of data representing the relationship between the density of a formed patch image and the density of an image signal used. In this case, image processing coefficients in a high density region of the maximum density of a formed patch image to the target maximum density may lose accuracy.

SUMMARY OF THE INVENTION

According to an aspect of the present invention, an image forming apparatus includes: an image forming unit configured to form an image on an image carrier based on an image signal; a holding unit configured to hold an image processing coefficients, each image processing coefficient of the image processing coefficients representing a relationship between an input density and an output density corresponding to a density of the image signal to determine the density of the image signal to be output to the image forming unit when performing tone correction; a reading unit configured to read a density of the image formed on the image carrier; and an updating unit configured to, when a plurality of measurement images are formed on the image carrier by the image forming unit and read by the reading unit, update an image processing coefficient based on the relationship between densities of the measurement images read by the reading unit and densities of image signals for forming the measurement images. The updating unit is further configured to, when a maximum value of an output density of the image processing coefficients is smaller than a maximum value of the density of the image signal, form at least one first measurement image out of the plurality of measurement images in accordance with an image signal indicating a density higher than the maximum value of the output density of the image processing coefficients.

Further features of the present invention will become apparent from the following description of exemplary embodiments with reference to the attached drawings.

BRIEF DESCRIPTION OF THE DRAWINGS

FIGS. 4A and 4B are tables showing image processing coefficients according to an embodiment;

FIG. 5 is a table showing the relationship between a density indicated by image data of a patch image and the density of an image signal to be output to an image forming unit according to an embodiment;

DESCRIPTION OF THE EMBODIMENTS

Exemplary embodiments of the present invention will now be described with reference to the accompanying drawings. In the following drawings, building components not necessary for a description of the embodiments will not be illustrated.

First Embodiment

Figure 1:
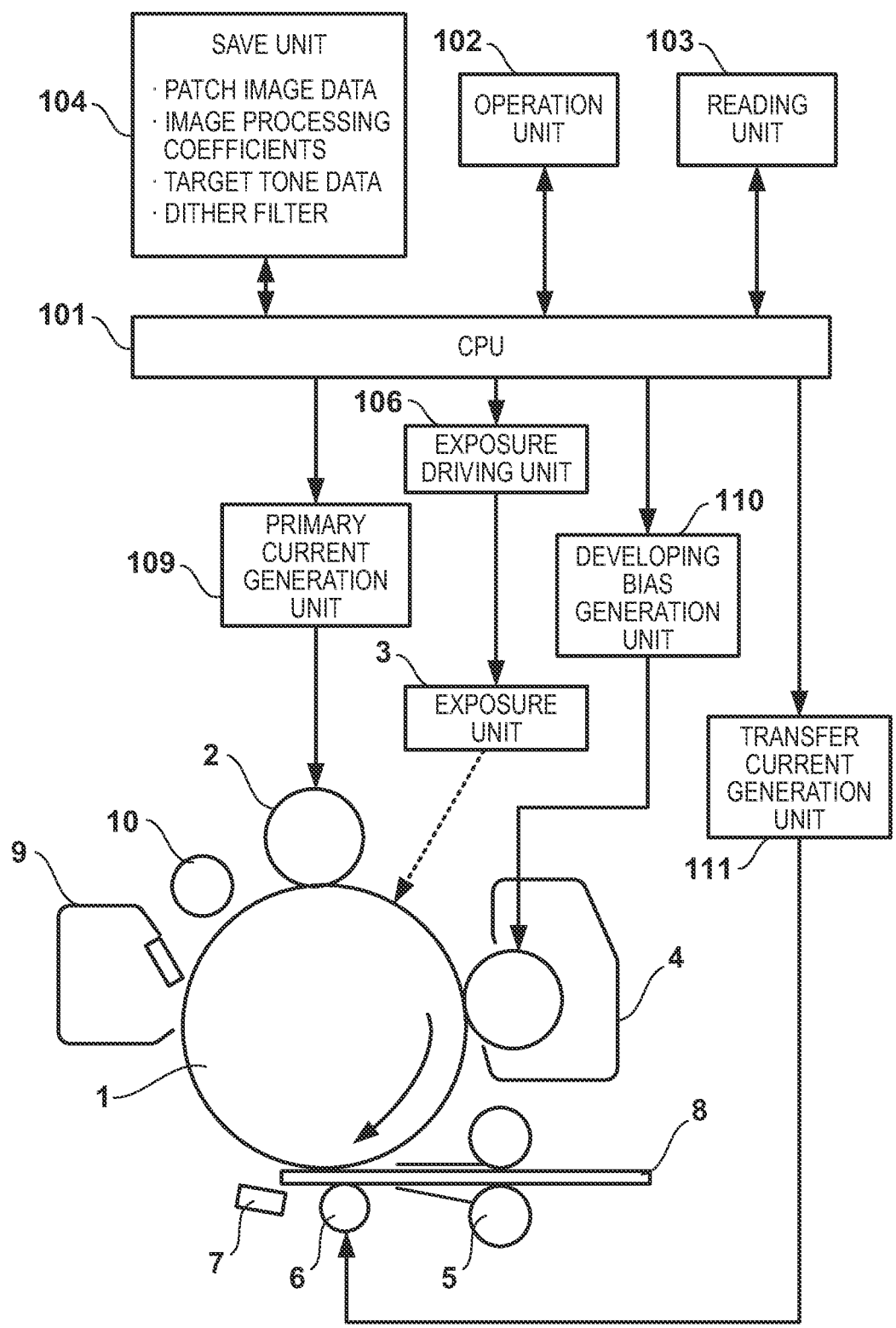
FIG. 1 is a view showing the arrangement of an image forming apparatus according to an embodiment.

FIG. 1 is a view showing the arrangement of an exemplary image forming apparatus according to the first embodiment. First, the arrangement of an image forming unit will be explained. A charging unit 2 charges the surface of a photosensitive member 1 which rotates in a direction indicated by an arrow in FIG. 1. A primary current generation unit 109 supplies a current to the charging unit 2 to charge the photosensitive member 1. An exposure unit 3 exposes the surface of the photosensitive member 1 to a laser beam corresponding to an image to be formed, thereby forming an electrostatic latent image on the photosensitive member 1. An exposure driving unit 106 generates a signal for controlling emission of a laser beam from the exposure unit 3, and outputs it to the exposure unit 3. A developing bias generation unit 110 applies a developing bias to the developing roller of a developing unit 4. In accordance with the developing bias, the developing unit 4 supplies, to the photosensitive member 1, toner serving as a developer contained in the developing unit 4, thereby developing and visualizing the electrostatic latent image on the photosensitive member 1 with the toner. A transfer unit 6 transfers the toner image formed on the photosensitive member 1 to a printing material 8, which is a image carrier, conveyed by a roller 5 and the like. A transfer current generation unit 111 supplies a transfer current to the transfer unit 6. A separation unit 7 separates the printing material 8 from the photosensitive member 1. The printing material 8 on which the toner image has been transferred is conveyed by a conveyance mechanism (not shown), a fixing unit (not shown) fixes the toner image, and then the printing material 8 is discharged from the apparatus. A cleaning unit 9 removes toner which has not been transferred by the transfer unit 6 and remains on the photosensitive member 1. A pre-exposure unit 10 removes the rest potential of the photosensitive member 1. This is the description of the image forming unit.

A CPU 101 is the control unit of the image forming apparatus, and controls the primary current generation unit 109, exposure driving unit 106, developing bias generation unit 110, transfer current generation unit 111, and the like. Note that the image forming apparatus shown in FIG. 1 forms a single-color image, but may be a color image forming apparatus which uses a plurality of colors. A reading unit 103 reads an image on a printing material by using a CCD or the like under the control of the CPU 101, and acquires image data representing the density of a read image or the like. An operation unit 102 is an interface which allows the user of the image forming apparatus to issue an operation instruction to the image forming apparatus. A save unit 104 is a storage device and saves various data. Note that the save unit 104 may be one storage device or include a plurality of storage devices.

Next, a processing sequence when the above-described image forming unit forms an image read by the reading unit 103 will be explained. Upon receiving an image forming instruction from the operation unit 102, the CPU 101 controls the reading unit 103 to read an image formed on a printing material, and acquires image data corresponding to the image formed on the printing material. The save unit 104 holds information representing image processing coefficients serving as tone correction data. The CPU 101 converts the density of the read image data based on the image processing coefficient held in the save unit 104, thereby generating an image signal. That is, the CPU 101 performs tone correction for the read image data based on the image processing coefficient. Subsequently, the CPU 101 performs dither processing for the tone-corrected image signal based on information representing a dither filter held in the save unit 104. As the dither processing, a known ordered dither method or minimized average error method is usable. The CPU 101 outputs the image signal having undergone dither processing as exposure data to the exposure driving unit 106. In correspondence with the exposure data, the exposure driving unit 106 drives the exposure unit 3 to form an electrostatic latent image on the photosensitive member 1. After that, an image is formed on the printing material 8 by the above-described processing.

FIG. 4A exemplifies image processing coefficients held in the save unit 104. An input in FIG. 4A is an input density, that is, a density indicated by image data before correction, and has a value obtained when a maximum density serving as a target (to be referred to as a target maximum density hereinafter) is defined as 100%. An output in FIG. 4A is an output density, that is, a density after tone correction, and corresponds to the density of an image signal to be output to the image forming unit for image formation. Note that the maximum value of the density of an image signal, that is, 100% is an arbitrary criterion which considers the characteristics of an image signal and those of the image forming unit. The value of the output density is based on this criterion. In the image processing coefficients of FIG. 4A, an image having the target maximum density, that is, a 100% input density is converted into an image signal which indicates a density of 81%. The image signal indicating the density of 81% undergoes dither processing, and is supplied to the exposure driving unit 106. As a result, an image having the target maximum density is formed in accordance with the characteristics of the image forming apparatus at this time. To the contrary, if an image is formed based on an image signal indicating a density of 100%, an image having a density higher than the target maximum density is formed, as represented by the image processing coefficients in FIG. 4A.

Figure 3:
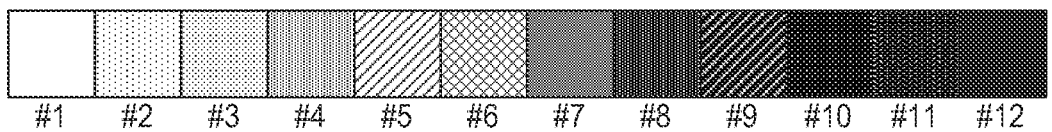
FIG. 3 is a view showing a patch image according to an embodiment.

In the embodiment, to update or generate image processing coefficients in the save unit 104, patch images serving as measurement images including a plurality of tones are formed. In the embodiment, for example, 12 patch images #1 to #12 having different tones are used, as shown in FIG. 3. Patch image data including patch image density information for forming the patch images #1 to #12 are saved in advance in the save unit 104. The embodiment assumes that data of the patch image #1 indicates a density of 0%, and patch image data of the patch images #2 to #10 indicate densities of 10%, 20%, 30%, 40%, 50%, 60%, 70%, 80%, and 90%, respectively. The embodiment also assumes that patch image data of the patch image #11 indicates a density of 99% and patch image data of the patch image #12 indicates a density of 100%.

Figure 2:
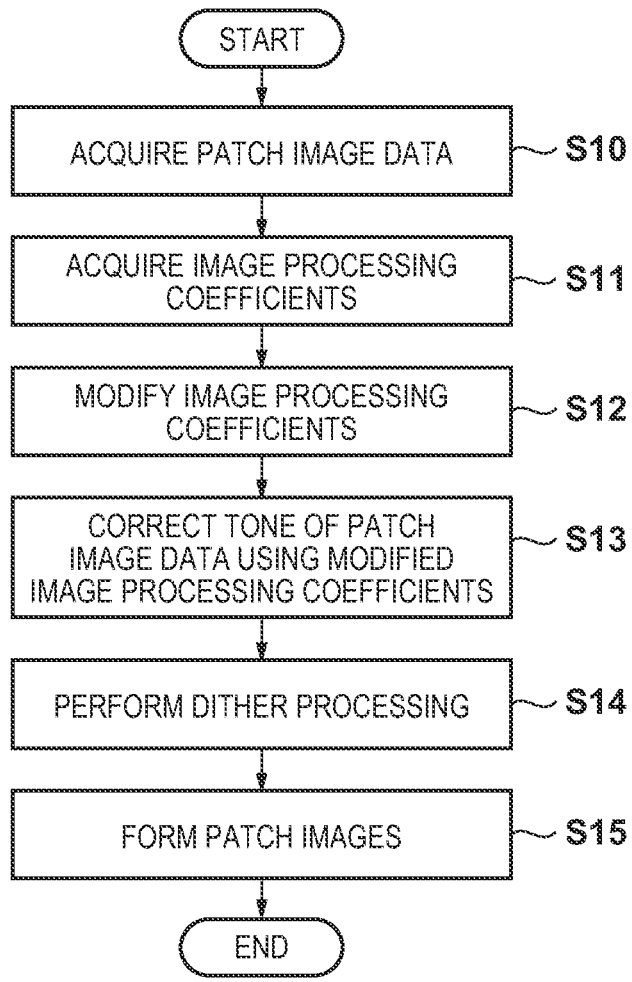
FIG. 2 is a flowchart showing patch image formation processing according to an embodiment.

Image processing coefficient update processing is executed by two processes, that is, patch image formation processing and image processing coefficient determination processing. The patch image formation processing will be explained with reference to FIG. 2. The CPU 101 acquires patch image data from the save unit 104 in step S10, and acquires image processing coefficients from the save unit 104 in step S11. The image processing coefficients held in the save unit 104 have been generated by previous image processing coefficient update processing. Note that image processing coefficients used in the first image processing coefficient update processing are set in advance in the save unit 104.

The CPU 101 modifies the image processing coefficients acquired in step S11. FIG. 4A exemplifies image processing coefficients acquired from the save unit 104. FIG. 4B shows modified image processing coefficients obtained by modifying the image processing coefficients in FIG. 4A. In the modification, as shown in FIGS. 4A and 4B, an output based on an image processing coefficient acquired from the save unit 104 with respect to an input having a density of 100% is changed into 100%. In step S13, the CPU 101 corrects the patch image data by using the modified image processing coefficients. FIG. 5 shows the relationship between an input density indicated by patch image data of each patch image in FIG. 3 and an output density having undergone tone correction using the modified image processing coefficient shown in FIG. 4B. The CPU 101 performs dither processing for an image signal indicating the output density after tone correction in step S14, and forms patch images on the printing material 8 in step S15.

Figure 6:
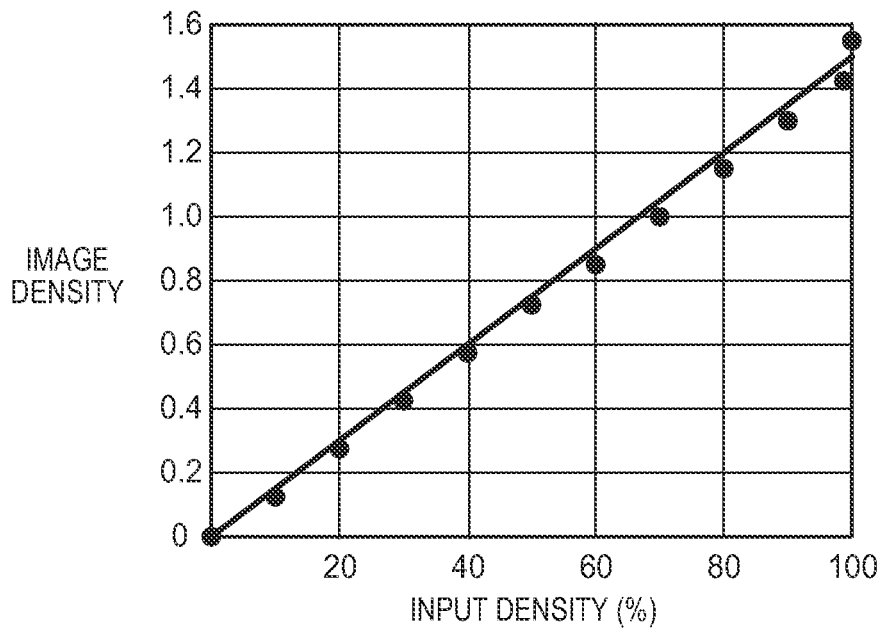
FIG. 6 is a graph showing the relationship between an input density indicated by image data of a patch image and the density of an image to be formed according to an embodiment.

FIG. 6 is a graph in which the relationship between an input density when forming a patch image, that is, the density of patch image data held in the save unit 104, and the density of an image formed on the printing material 8 is plotted. The solid line indicates a target density with respect to an input density. Note that the image density is a reflection density measured using an X-rite 504 SpectroDensitometer. In the embodiment, patch images are formed using image processing coefficients created in previous image processing coefficient update processing, so the density intervals between images to be formed also become almost constant. Image processing coefficients other than those for the densities of images to be formed are determined by interpolation processing. By performing tone correction based on the image processing coefficients and forming patch images, the density intervals between images to be formed becomes almost constant, improving the accuracy of interpolation processing.

However, the use of the image processing coefficients may restrict the maximum density of an output. For example, for the image processing coefficients in FIG. 4A, the maximum value of the density of an image signal output to the image forming unit is 81%. In the embodiment, to form at least one patch image by an image signal indicating a density of 100% regardless of the image processing coefficients, the image processing coefficients are modified when forming a patch image.

Figure 7:
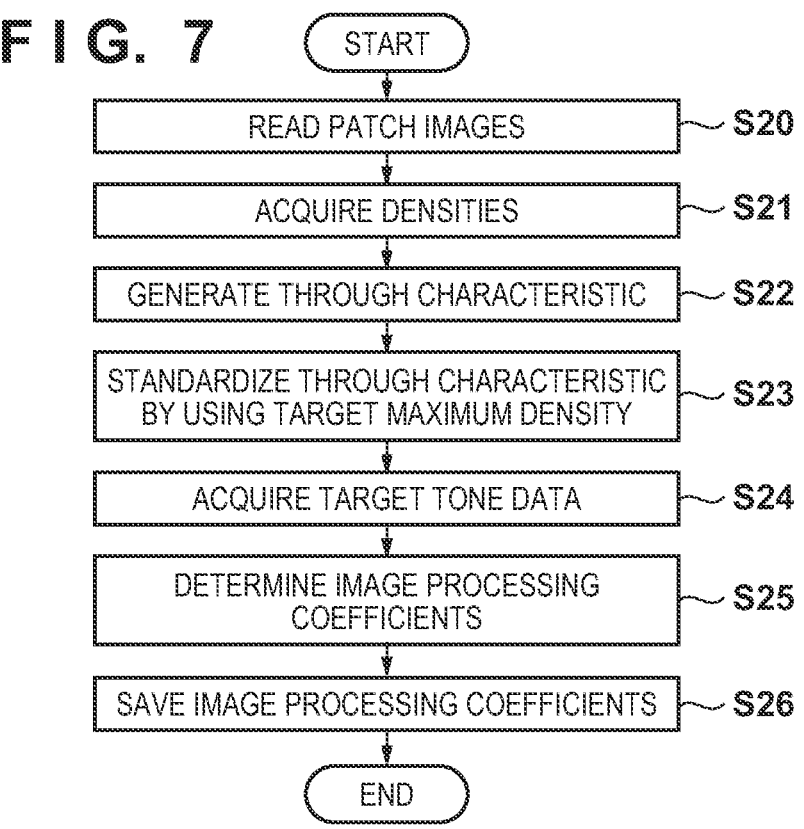
FIG. 7 is a flowchart showing image processing coefficient determination processing according to an embodiment.

Subsequently, image processing coefficient determination processing will be explained with reference to FIG. 7. First, in step S20, the CPU 101 uses the reading unit 103 to read the patch images formed on the printing material 8 in the formation processing of FIG. 2. In step S21, the CPU 101 acquires image data each representing a density. Note that the user sets the printing material 8 bearing the patch images on the reading unit 103. In step S22, the CPU 101 creates a through characteristic representing the relationship between the density of an image signal output to the image forming unit in order to form each patch image, that is, a density represented in the output column of FIG. 5, and the density of each patch image acquired in step S21. Note that the densities of images to be formed by image signals having densities other than those in the output column of FIG. 5 are obtained by, for example, linear interpolation of the relationship between the density in the output column of FIG. 5 and the density of an image to be formed. Accordingly, a through characteristic representing the relationship between the density of an image signal in steps of, for example, 1% and the density of an image to be formed is generated.

In step S23, the CPU 101 standardizes the through characteristic by using the target maximum density. For example, the target maximum density is set as 100%, and the density of a formed image is specified by a ratio to the target maximum density. For example, the target maximum density is 1.5, and this value is saved in advance in the save unit 104.

Figure 8:
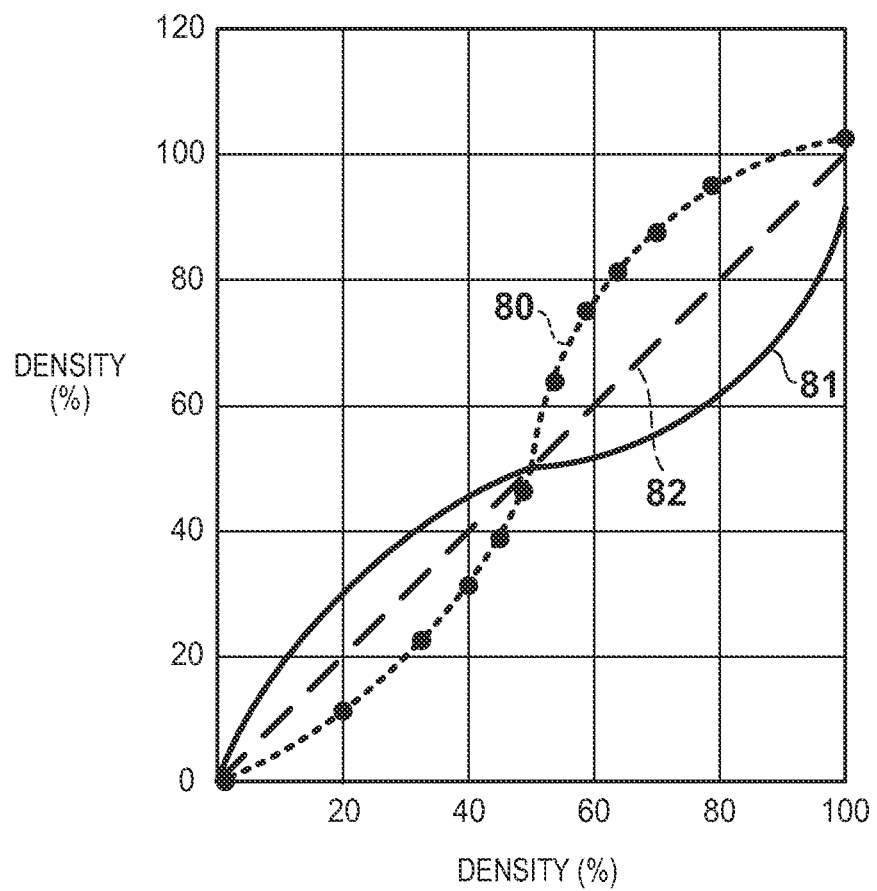
FIG. 8 is a graph showing the relationship between the through characteristic and the image processing coefficient according to an embodiment.

Then, the CPU 101 acquires target tone data from the save unit 104 in step S24, and determines image processing coefficients after updating that are used in subsequent image formation in step S25. FIG. 8 is a graph for explaining determination of image processing coefficients in step S25. In FIG. 8, a reference numeral 80 denotes a through characteristic, a reference numeral 81 denotes a determined image processing coefficient, and a reference numeral 82 denotes a target tone indicated by the target tone data.

For the through characteristic 80, the abscissa in FIG. 8 indicates the density of an image signal output to the image forming unit, and the ordinate indicates a formed image density. Note that the formed image density is given by a ratio using the target maximum density as a reference. The density of the image signal is set using, as 100%, an arbitrary reference determined in consideration of the characteristics of the image signal and those of the image forming unit. Filled circles indicate actually used image signals and actually formed image densities, and the remaining portions are obtained by interpolation processing. For example, FIG. 8 shows that, when the density of an image signal is 100%, an image having 102% density of a target maximum density is formed. For the target tone, the abscissa in FIG. 8 indicates an input density, that is, a density indicated by image data before tone correction, and the ordinate indicates the density of an image to be formed. Note that the input density and the density of an image to be formed are given by ratios using the target maximum density as a reference. For example, FIG. 8 shows that, when the input density is 100%, an image having the same density as the target maximum density should be formed. Further, for the image processing coefficient 81, the abscissa in FIG. 8 indicates an input density, and the ordinate indicates an output density used as the density of an image signal. The image processing coefficient 81 is determined by inversely transforming the through characteristic 80 with respect to the target tone. For example, the image processing coefficient in FIG. 8 represents that an input density of 100% is converted into an output density of 91%. However, when the density of an image signal is 91% in accordance with the through characteristic, an image having the same density as the target maximum density is actually formed. By using the image processing coefficient 81 in FIG. 8, an image having the target maximum density is formed from image data having a density of 100%, as represented by the target tone. In step S26, the CPU 101 saves the image processing coefficients determined in step S25 in the save unit 104. Then, the image processing coefficient update processing ends. The image processing coefficients saved in step S26 are used for tone correction in normal image formation.

Figure 9A:
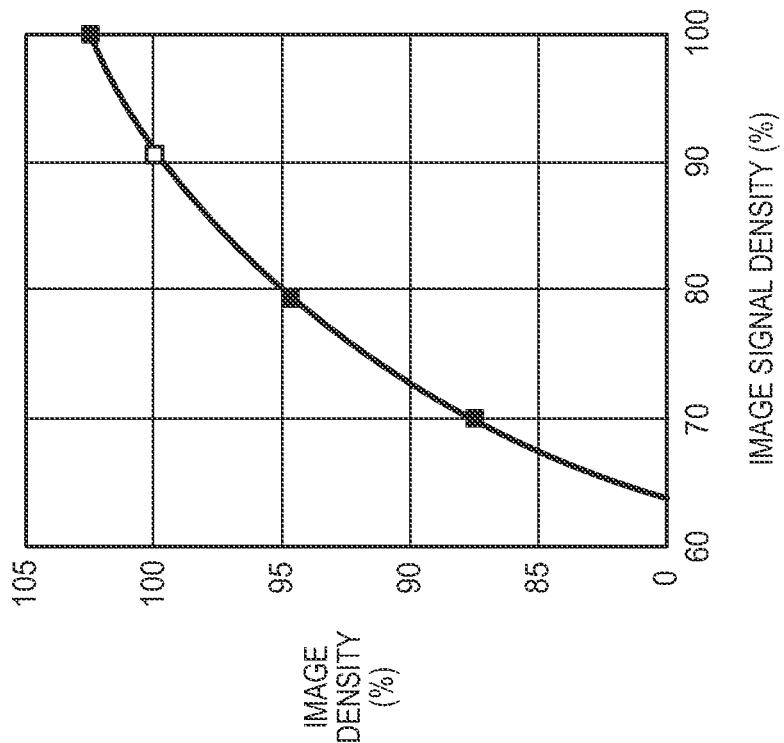
FIG. 9A is a graph showing a through characteristic when patch images are formed using the image processing coefficients in FIG. 4A without modification.
Figure 9B:
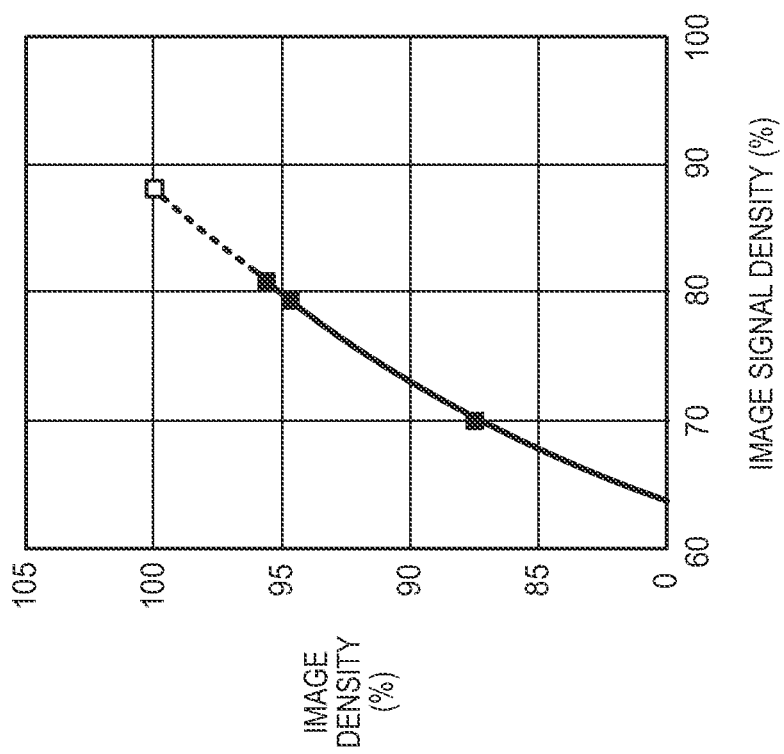
FIG. 9B is a graph showing a through characteristic when the image processing coefficients in FIG. 4A are modified and patch images are formed.

FIG. 9A shows a through characteristic when patch images are formed using the image processing coefficients in FIG. 4A without modification. FIG. 9B shows a through characteristic when the image processing coefficients in FIG. 4A are modified and patch images are formed. The maximum density of an image signal is 81% in the image processing coefficients of FIG. 4A, and an image density at this time is almost 96% of the target maximum density. Thus, the density of an image signal for forming an image having a density of 100% from about 96% of the target maximum density needs to be determined by extrapolation from data on a lower density side than the target maximum density. As represented by an open square in FIG. 9A, the density of an image signal for obtaining the target maximum density is determined to be 87% by extrapolation. In the embodiment, however, a patch image is formed in accordance with an image signal indicating a density of 100%. By interpolation using the formed patch images, image processing coefficients can be determined at high accuracy. For example, as represented by an open square in FIG. 9B, the density of an image signal for obtaining the target maximum density is determined to be 91% in the embodiment. Note that when patch images were formed while changing the density of the image signal by every 1%, the density of an image signal for obtaining the target maximum density was 90%. From a comparison with the use of unmodified image processing coefficients in FIG. 9A, the embodiment reduces a density error of an image signal for forming an image having the target maximum density. This means that the density error of an image to be formed at the maximum density is reduced by about 0.03 in conversion into the reflection density. Therefore, the arrangement according to the embodiment can stably reproduce an image density in a high density region, improving the reproducibility of characters and the quality of the solid density.

Second Embodiment

Figure 10:
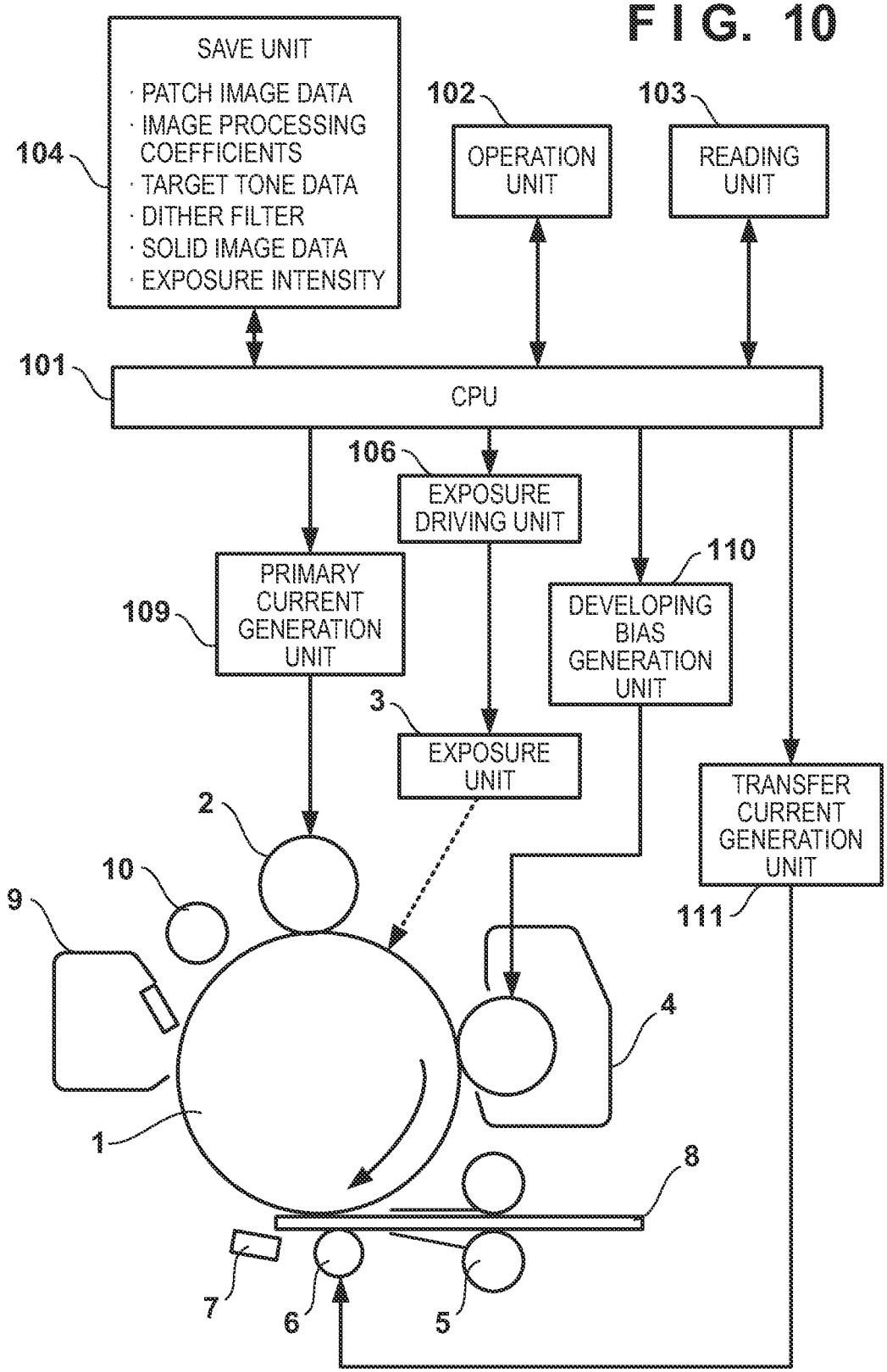
FIG. 10 is a view showing the arrangement of an image forming apparatus according to an embodiment.

A difference of the second embodiment from the first embodiment will be mainly explained, and a description of the contents described in the first embodiment will not be repeated. In the second embodiment, the density of an image formed when the density of an image signal is 100% is adjusted by changing an image forming condition. Although the second embodiment uses the exposure intensity as the image forming condition, an arbitrary parameter capable of controlling the density of an image to be formed is usable. An image density formed by changing the exposure intensity changes because the contrast potential changes to change the amount of toner attached to an electrostatic latent image. FIG. 10 is a view showing the arrangement of an image forming apparatus according to the second embodiment. A difference from the first embodiment is that a save unit 104 holds solid image data for forming a patch image used in solid density adjustment processing, and information representing an exposure intensity determined by the solid density adjustment processing. Note that the solid image data represents a density of 100%.

Figure 11:
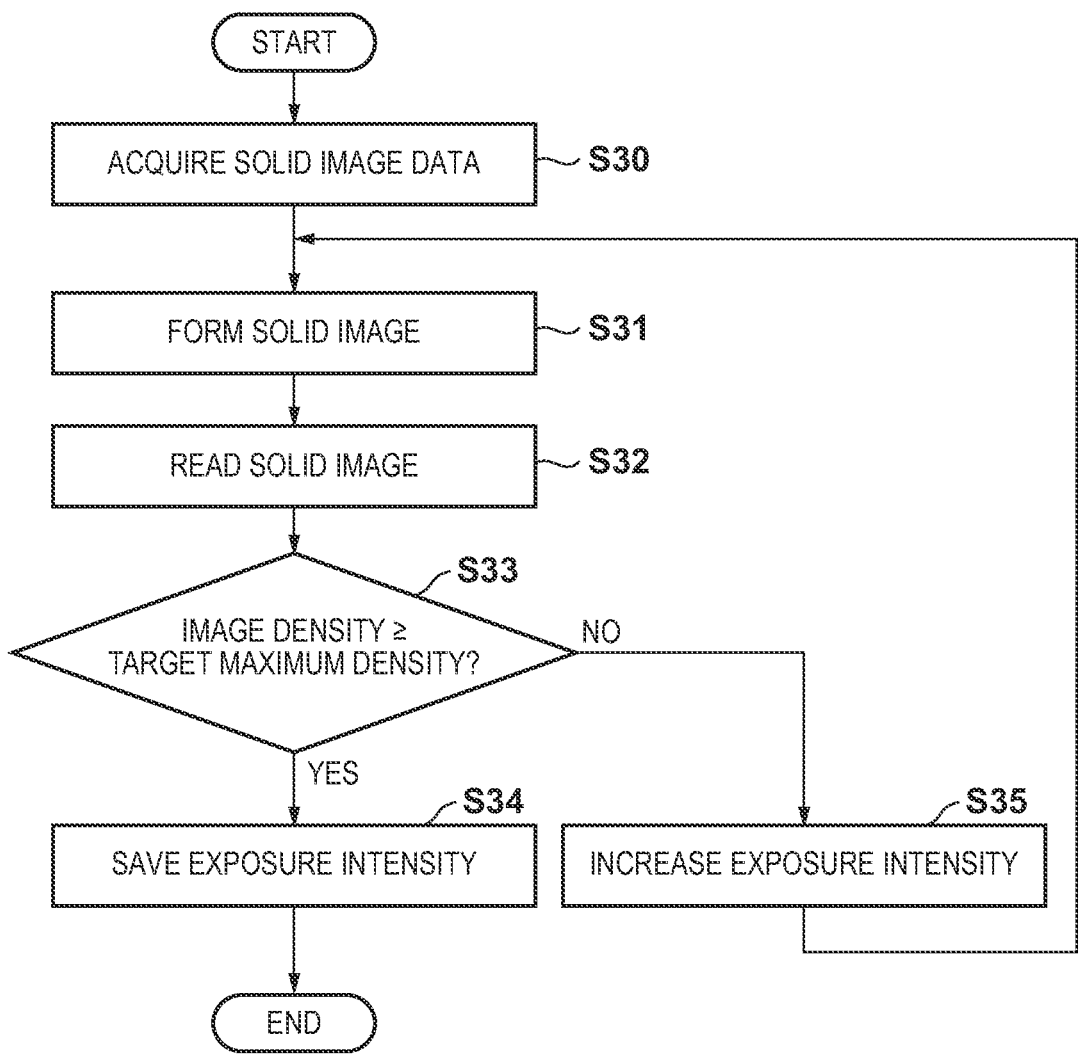
FIG. 11 is a flowchart showing solid density adjustment processing according to an embodiment.

FIG. 11 is a flowchart showing solid density adjustment processing. Upon receiving a solid density adjustment start instruction from an operation unit 102, a CPU 101 acquires the solid image data from the save unit 104 in step S30. In step S31, the CPU 101 forms a patch image serving as a solid image on a printing material at a predetermined exposure intensity based on the solid image data. At this time, tone correction using the image processing coefficients is not executed. Alternatively, when the input density is 100%, similar to the first embodiment, image processing coefficients modified to convert the input density of 100% into an output density of 100% are applied. As the predetermined exposure intensity, an arbitrary initial value, for example, a minimum value in a settable intensity range is usable. In step S32, when the user sets the printing material on a reading unit 103, the CPU 101 reads the solid image formed on the printing material. In step S33, the CPU 101 determines whether the density of the solid image read in step S32 is equal to or higher than a target maximum density. If the density of the solid image is equal to or higher than the target maximum density, the CPU 101 saves, in the save unit 104 in step S34, an exposure intensity used to form the solid image in step S31, and ends the solid density adjustment processing. If the density of the solid image is lower than the target maximum density, the CPU 101 increases the exposure intensity by a predetermined amount, and repeats the process from step S31.

Thereafter, the CPU 101 performs image processing coefficient update processing described in the first embodiment by using the exposure intensity saved in step S34. With this arrangement, the maximum density of a patch image formed in the image processing coefficient update processing becomes equal to or higher than the target maximum density, and tone correction can be performed by interpolation in a necessary density region.

In the above embodiments, the image processing coefficients are modified to convert an input density of 100% into an output density of 100%. However, if the input density is converted into a density which is higher than the maximum value of the output density of the image processing coefficients and is equal to or lower than the maximum value of the density of an image signal to the image forming unit, the section where extrapolation is performed can be shortened, improving the accuracy of interpolation processing. More specifically, for the image processing coefficients of FIG. 4A, it suffices to convert an input density of 100% into an output density which is higher than 81% and equal to or lower than 100%. Note that each embodiment may be applied only when the maximum value of the output density based on the image processing coefficients is smaller than the maximum value of the density of an image signal, that is, 100%.

In the above embodiments, patch image data corresponding to respective patch images are saved in the save unit 104, and tone correction is performed using the image processing coefficients for all patch image data. Thus, an output density based on the image processing coefficient with respect to an input density of 100% is modified into a density higher than the maximum value of the output density of the image processing coefficient, not to convert a patch image representing a density of 100% into a patch image of a lower density. This means the use of two types of patch images, that is, a patch image (first measurement image) converted into a density higher than the maximum value of the output density of the image processing coefficients regardless of the image processing coefficients, and a patch image (second measurement image) to undergo tone correction in accordance with the image processing coefficients. It is therefore possible to prepare patch images separately in two groups, that is, a group of the first image data corresponding to the first patch images and a group of the second image data corresponding to the second patch images. In this case, the first image data is used as an image signal to perform image formation without performing tone correction. In contrast, the second image data undergoes tone correction to perform image formation without modifying the image processing coefficient saved in the save unit 104. At this time, the density of the first patch image is set to, for example, 100% which is the maximum value of the density of the image signal. However, a plurality of patch images in a high density region of 80% or more or 90% or more can be prepared as the first patch images. Even in this arrangement, while images having densities at almost equal intervals are formed on the printing material 8 by using the image processing coefficients, the section where extrapolation is performed when determining the image processing coefficients can be shortened.

In the above embodiments, patch images are formed on a printing material serving as an image carrier, and read by the reading unit 103. Alternatively, patch images formed on another image carrier such as an intermediate transfer member may be read by a reading unit such as a sensor arranged to face the image carrier.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-096041, filed on Apr. 19, 2012 which is hereby incorporated by reference herein in its entirety.

What is claimed is:
1. An image forming apparatus comprising:
an image forming unit configured to form an image on an image carrier based on an image signal;

a holding unit configured to hold image processing coefficients, each image processing coefficient of the image processing coefficients representing a relationship between an input density and an output density corresponding to a density of the image signal to determine the density of the image signal to be output to the image forming unit when performing tone correction;

a reading unit configured to read a density of the image formed on the image carrier; and an updating unit configured to, when a plurality of measurement images are formed on the image carrier by the image forming unit and read by the reading unit, update an image processing coefficient based on the relationship between a density of a measurement image read by the reading unit and a density of an image signal for forming the measurement image, wherein the updating unit is further configured to, when a maximum value of an output density of the image processing coefficients is smaller than a maximum value of the density of the image signal, form at least one first measurement image out of the plurality of measurement images in accordance with an image signal indicating a density higher than the maximum value of the output density of the image processing coefficients.

2. The apparatus according to claim 1, wherein the holding unit is further configured to hold first image data representing a density of the first measurement image out of the plurality of measurement images, and second image data representing a density of a second measurement image different from the first measurement image out of the plurality of measurement images, and the updating unit is further configured to output an image signal indicating a density represented by the first image data to the image forming unit to form the first measurement image, and output an image signal indicating a density obtained by performing tone correction for the second image data based on the image processing coefficient to the image forming unit to form the second measurement image.

3. The apparatus according to claim 1, wherein the holding unit is further configured to hold first image data representing a density of the first measurement image out of the plurality of measurement images, and second image data representing a density of a second measurement image different from the first measurement image out of the plurality of measurement images, and the updating unit is further configured to modify the output density of an image processing coefficient with respect to the density represented by the first image data into a value larger than a maximum value of the output density of the image processing coefficients, output image signals obtained by performing tone correction for the first image data and the second image data based on the image processing coefficients to the image forming unit, to form the first measurement image and the second measurement image.

4. The apparatus according to claim 1, wherein the density of the image signal to be output to the image forming unit to form the first measurement image has the maximum value of the density of the image signal.

5. The apparatus according to claim 1, wherein before updating the image processing coefficient, the updating unit controls an image forming condition of the image forming unit to set a density of a solid image which is formed by the image forming unit on the image carrier and read by the reading unit, to be not lower than a target maximum density.

6. The apparatus according to claim 5, wherein the image forming condition includes an exposure intensity when forming an electrostatic latent image on a photosensitive member.

7. An image forming apparatus comprising:

a conversion unit configured to convert image data based on a converting condition;

an image forming unit configured to form an image based on image data converted by the converting unit;

a reading unit configured to read a measurement image formed by the image forming unit;

an updating unit configured to control the converting unit to convert measurement image data based on the converting condition, control the image forming unit to form a plurality of measurement images based on the converted measurement image data, and update the converting condition based on a reading result of the plurality of measurement images by the reading unit; and a control unit configured to control a change of the converting condition in a case where the converting unit converts the measurement image data such that a density of a predetermined measurement image in the plurality of measurement images increases.

8. The apparatus according to claim 7, wherein the control unit is further configured to change the converting condition in a case where the converting unit converts the measurement image data such that the density of the predetermined measurement image is higher than a target density.

9. The apparatus according to claim 7, wherein the measurement image data include values of image signals, each of which associates with a density of a measurement image in the plurality of measurement images, and the control unit is further configured to change the converting condition such that a value of an image signal corresponding to the predetermined measurement image is higher than a predetermined value if the value of the image signal corresponding to the predetermined measurement image is lower than the predetermined value.

10. The apparatus according to claim 7, wherein the measurement image data include values of image signals, each of which associates with a density of a measurement image in the plurality of measurement images, and the control unit is further configured to not change the converting condition if a value of an image signal corresponding to the predetermined measurement image is higher than a predetermined value.

11. The apparatus according to claim 7, wherein the converting condition includes data for correcting tone of an image formed by the forming unit.

12. The apparatus according to claim 7, wherein the reading unit is further configured to read the measurement image on a recording material formed by the image forming unit.

13. The apparatus according to claim 7, further comprising an intermediate transfer body, wherein the image forming unit is further configured to form an image on the intermediate transfer body, and transfer the image on the intermediate body onto a recording material, and the reading unit is further configured to read the measurement image on the intermediate transfer body formed by the image firming unit.

14. An image forming apparatus comprising:

a conversion unit configured to convert image data based on a converting condition;

an image forming unit configured to form an image based on image data converted by the converting unit;

a reading unit configured to read a measurement image formed by the image forming unit; and an updating unit configured to control the converting unit to convert second measurement image data different from first measurement image data based on the converting condition, control the image forming unit to form a first measurement image based on the first measurement image data unconverted by the converting unit, control the image forming unit to form a second measurement image based on the second measurement image data converted by the converting unit, and update the converting condition based on a first reading result of the first measurement image by the reading unit and a second reading result of the second measurement image by the reading unit, wherein a density of the first measurement image is higher than a density of the second measurement image.

15. The apparatus according to claim 14, wherein the converting condition includes data for correcting tone of an image formed by the forming unit.

16. The apparatus according to claim 14, wherein the reading unit is further configured to read the measurement image on a recording material formed by the image forming unit.

17. The apparatus according to claim 14, further comprising an intermediate transfer body, wherein the image forming unit is further configured to form an image on the intermediate transfer body, and transfer the image on the intermediate body onto a recording material, and the reading unit is further configured to read the measurement image on the intermediate transfer body formed by the image firming unit.

* * * * *